Figure 1:
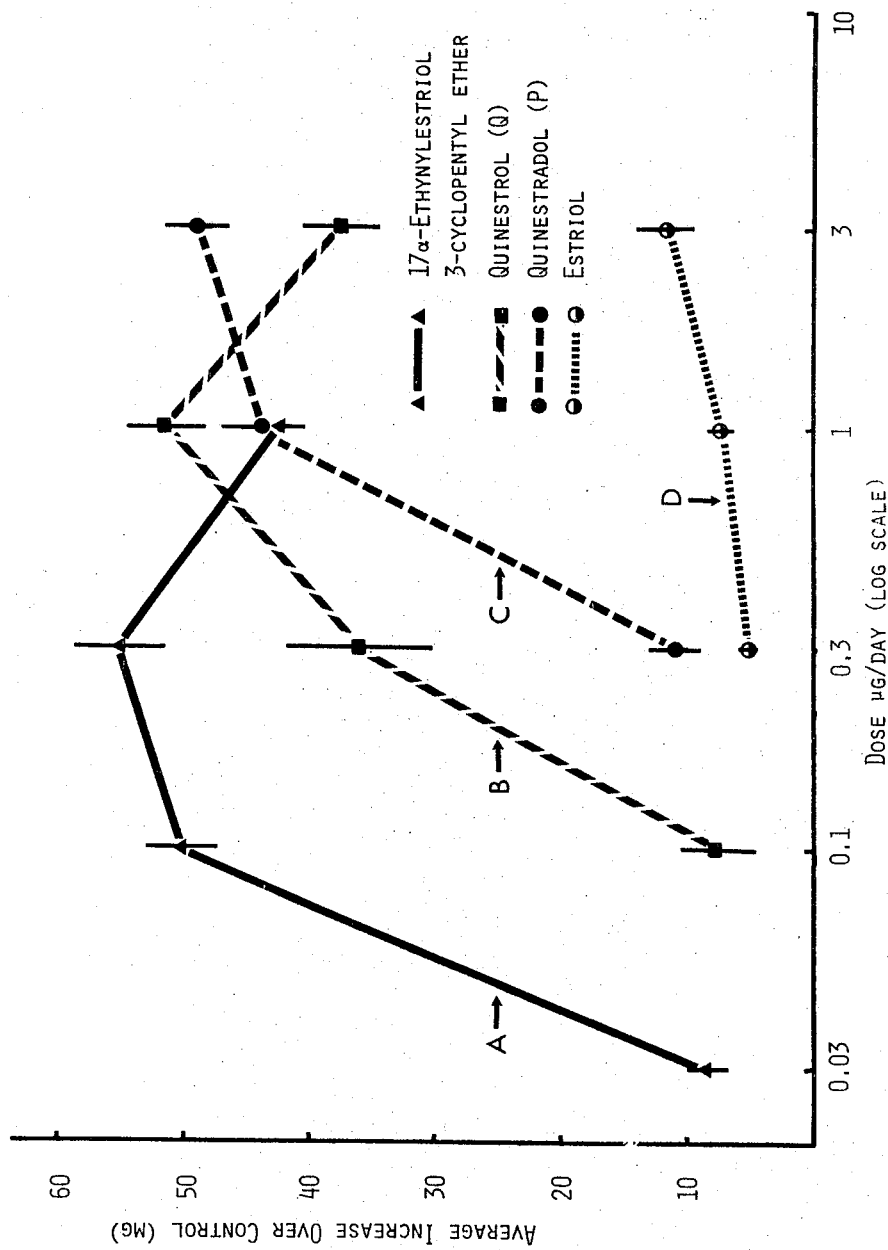

United States Patent [19]
Kraay et al.

[11] 3,868,452
[45] Feb. 25, 1975

[54] 17ALPHA-ETHYNYLESTRIOL 3-CYCLOPENTYL ETHER

[75] Inventors: Russell J. Kraay; Eugene Farkas, both of Indianapolis, Ind.

[73] Assignee: Eli Lilly and Company, Indianapolis, Ind.

[22] Filed: Nov. 1, 1973

[21] Appl. No.: 411,988

Related U.S. Application Data

[60] Division of Ser. No. 136,671, April 23, 1971, Pat. No. 3,790,605, which is a continuation-in-part of Ser. No. 127,690, March 24, 1971, abandoned.

[52] U.S. Cl. .................................................. 424/238
[51] Int. Cl. ............................................. A61k 17/06
[58] Field of Search ..................................... 424/238

Primary Examiner—Henry A. French
Attorney, Agent, or Firm—James L. Rowe; Everet F. Smith

[57] ABSTRACT

17α-Ethynylestriol 3-cyclopentyl ether, estrogenic hormone useful in treatment of menopausal syndrome and all other conditions of estrogen deficiency or in which estrogens may be used therapeutically.

2 Claims, 3 Drawing Figures

INTERACTION OF ESTRADIOL AND 17α-ETHYNYLESTRIOL 3-CYCLOPENTYL ETHER WITH UTERINE AND VAGINAL ESTROGEN RECEPTORS

17 ALPHA-ETHYNYLESTRIOL 3-CYCLOPENTYL ETHER

CROSS-REFERENCE

This application is a division of our copending application Ser. No. 136,671 filed Apr. 23, 1971, now U.S. Pat. No. 3,790,605 which was a continuation-in-part application of our then co-pending application Ser. No. 127,690, filed Mar. 24, 1971, now abandoned.

BACKGROUND OF THE INVENTION

Estriol, a weak estrogen, has been used to treat menopausal syndrome because, unlike other estrogens, it has a relatively greater action on the vagina than on the uterus. The absolute activity of estriol and its relative lack of oral efficacy, however, have relegated it to an unimportant position in the armamentarium of the specialist treating menopausal symptoms. At present two related compounds, 17α-ethynylestradiol 3-cyclopentyl ether (Quinestrol) (Q) and estriol 3-cyclopentyl ether (quinestradol) (P) have both been used by physicians treating menopausal syndrome in preference to estriol itself because of their greater activity and oral efficacy. Quinestradol, however, is still an extremely weak estrogen compared to estradiol or 17α-ethynylestradiol. Quinestrol, on the other hand, is similar to other estradiol derivatives in that it causes undesirable stimulation of the uterine endometrium at doses that are effective in alleviating menopausal symptoms, thus causing breakthrough or withdrawal bleeding.

U.S. Pat. No. 3,051,510, issued Mar. 17, 1970, discloses several 17α-alkylene derivatives of estriol. The compounds disclosed therein are said to have estrogenic, progestational and hypocholesteremic activity. 17α-Ethynylestriol and its 17β-ethynyl isomer, are both disclosed by Engelfried et al., Arzneim. Forsch. 16, 1518-21 (1966).

It is the object of this invention to provide a potent estriol-like hormone which is orally active.

SUMMARY

In fulfillment of the above and other objects, this invention provides a novel compound, 17α-ethynylestriol 3-cyclopentyl ether (named systematically 17α-ethynylestra-1,3,5(10)-triene-3,16α,17β-triol 3-cyclopentyl ether) represented by the formula:

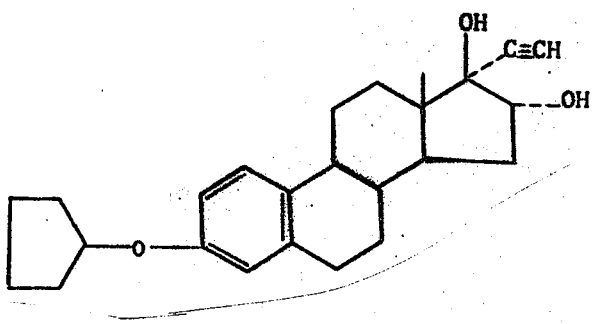

The above compound is a potent estrogen having a favorable uterotropic-vaginal ratio in its hormonal action and, in a second aspect of this invention, there is provided a method of treating menopausal syndrome, either spontaneous or induced, as well as any other estrogen-deficiency condition utilizing the above compound as the active agent.

16α-Ethynylestriol 3-cyclopentyl ether is a white crystalline solid and can be prepared either by the reaction of 17α-ethynylestriol and a cyclopentyl halide in the presence of sodium methoxide, thallium ethylate or like base or by the reaction of ethynyl magnesium bromide on 16α-acetoxy estrone 3-cyclopentyl ether. A more detailed preparation of 17α-ethynyl-estriol 3-cyclopentyl ether follows.

EXAMPLE

A 3 molar ethyl magnesium bromide Grignard Reagent in tetrahydrofuran prepared according to standard procedures, was filtered through glass wool and added slowly to 700 ml. of tetrahydrofuran previously saturated with acetylene at about 0° C. During the addition of the ethyl magnesium bromide, the reaction mixture was cooled to about 0° C. and in addition, acetylene was slowly bubbled through the solution. The resulting reaction produced about 1.75 moles of ethynyl magnesium bromide in 1300 ml. of tetrahydrofuran. Next, a solution containing 10 g. of 16α-hydroxyestrone diacetate (prepared by the method of Leeds, Fukushima, and Gallagher, J. Am. Chem. Soc. 76, 2943 (1954)) in 250 ml. of tetrahydrofuran was added to the ethynyl magnesium bromide solution in dropwise fashion. The reaction mixture was refluxed for 24 hours under a nitrogen atmosphere and was then cooled to about 0° C. About 750 ml. of a saturated ammonium chloride solution was added carefully followed by an equal volume of water. The organic materials were extracted into ethyl acetate. The ethyl acetate layer was separated and washed successively with water and saturated aqueous sodium chloride. The solution was dried and the solvents were evaporated in vacuo. The resulting residue was triturated with about 1 l. of boiling hexane and the hexane extract discarded. The remaining insoluble material was dissolved in about 1500 ml. of acetone to which was added 5 ml. of 70% aqueous perchloric acid. The solution was transferred to a flask which was stirred magnetically at ambient temperatures for about 12 hours. An excess of solid sodium bicarbonate was added and the resulting mixture filtered. The filtrate was concentrated to a volume of about 250 ml. and diluted with an equal volume of ethyl acetate. The ethyl acetate layer was washed successively with water and saturated aqueous sodium chloride and was dried. The volatile constituents were removed by evaporation in vacuo. The resulting residue was slurried with chloroform and chromatographed over about 500 g. of florisil. Elution with 3,000 ml. of chloroform, followed by evaporation of the chloroform in vacuo, yielded an orange oil. The oil was dissolved in an ether-hexane solvent mixture to yield crystals of 17 β-ethynylestra-1,3,5(10)-triene-3,16α,17 α-triol-16,17-acetonide, melting at about 208°-211° C. (The 17 β-ethynyl-17α-hydroxy isomer is produced as a minor component in the reaction of 16α-hydroxyestrone diacetate and ethynyl magnesium bromide.) Further development of the chromatogram with 1,000 ml. of ether gave a fraction containing both 17 α-ethynylestriol and the 17 β isomer, as determined by thin layer chromatography. Finally, elution with 1 l. of methanol yielded, after evaporation of the solvent, a dark brown solid showing only a single spot on thin-layer chromatography. The solid was washed with chloroform and filtered.

to yield about 5 g. of 17 α-ethynylestriol as a light tan powdery solid melting with decomposition at about 243°-5°C. Recrystallization of the solid from an ethyl acetate-hexane mixture yielded light tan crystals of 17 α-ethynylestriol melting with decomposition at about 245° C.

11.3 g. of 17α-ethynylestriol thus produced were dissolved in 500 ml. of methanol. A 50% molar excess of freshly prepared sodium methoxide in methanol was added. The resulting solution was concentrated in vacuo to a solid comprising the sodium salt of 17α-ethynylestriol. The solid was dissolved with warming in 500 ml. of dimethylforamide. 50 ml. of cyclopentyl bromide were added and the mixture heated to reflux under a nitrogen atmosphere for about 4 hours. The reaction mixture was cooled and then diluted with 1 l. of ethyl acetate and 1 l. of water. The resulting organic layer was washed 3 times with water followed by saturated aqueous sodium chloride wash and was then dried. Evaporation of the solvent in vacuo yielded a solid residue which was slurried with chloroform and chromatographed over about 100 g. of florisil. Elution with chloroform yielded a brownish solid residue on evaporation of the solvent. Recrystallization of this residue from a mixture of ethyl ether and hexane yielded about 7.7 g. of 17α-ethynylestriol 3-cyclopentyl ether, melting at about 162°-5° C.

An alternative preparation for the last step of the procedure is as follows: 2.1 g. of 17 α-ethynylestriol were dissolved in 100 ml. of absolute ethanol. A solution containing about 0.6 ml. of thallium ethylate in 10 ml. of benzene was added with stirring in dropwise fashion. Stirring was continued for another 10 minutes after which time the solvents were removed by evaporation in vacuo. The residue, comprising the thallium salt of 17α-ethynylestriol, was slurried with 100 ml. of dimethylformamide. 10 ml. of cyclopentyl bromide were added and the mixture heated at 90°-95°C. for 4 hours under nitrogen atmosphere. 17α-Ethynylestriol 3-cyclopentyl ether thus produced was isolated and purified as in the above example.

As previously stated, 17α-ethynylestriol 3-cyclopentyl ether is a potent estrogen having a favorable uterotropic-vaginal ratio in its hormonal action. The estrogenic activity of the compound is surprisingly high as measured by the procedure of Reuben et al., Endocr. 49, 429 (1951). In this procedure, treatment groups of 10 immature female mice each are injected with or dosed by gavage with the compound under test for 3 days at different dose levels. A control group is maintained, which receives only the injection vehicle, corn oil in the case of subcutaneous injection or gavage. The estrogenic activity is measured by the average increase in the uterine weights of the treated mice as compared to those of the untreated mice. Using treatment groups of 10 mice each yields statistically significant results.

FIG. 1 gives the results of this test when subcutaneous administration was employed. The four compounds employed in the test were 17α-ethynylestriol 3-cyclopentyl ether (curve 1-A), quinestrol (curve 1-B), quinestradol (curve 1-C), and estriol (curve 1-D). As can be seen from FIG. 1, 17α-ethynylestriol 3-cyclopentyl ether is about 3 times as active in its effect on the uterus as is quinestrol and about 10 times as active as quinestradol. Estriol shows little uterotropic activity even at the highest dose tested. Table 1 below summarizes the findings which are presented graphically in FIG. 1 and confirms quantitatively the above observations as to relative uterotropic activity.

Figure 2:
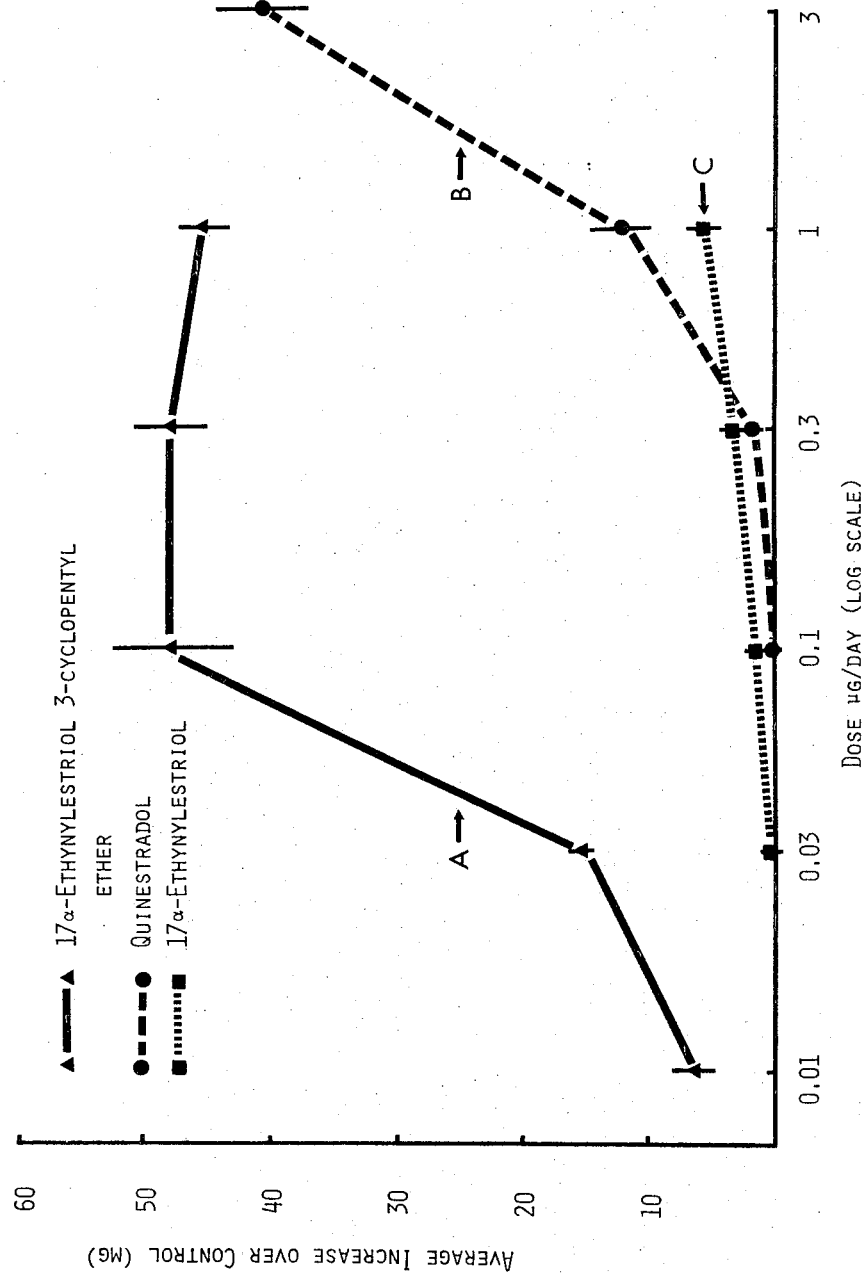

FIG. 2 gives the results of testing of three estrogenic hormones by the Reuben test using the oral route of administration. According to FIG. 2, 17α-ethynylestriol 3-cyclopentyl ether (curve 2-A) shows about the same activity by the oral route as by the subcutaneous route shown in FIG. 1 (curve 1-A). Quinestradol (curve 2-B) is about 1/30th as active as 17α-ethynylestriol 3-cyclopentyl ether, and 17α-ethynylestriol is virtually inactive by the oral route in this dose range. The oral activities of the three hormones which are presented graphically in FIG. 2 are summarized in Table 2 below and these quantitative figures bear out the above observations as to the unexpectedly greater potency of 17α-ethynylestriol 3-cyclopentyl ether than either of the single substituted estriol derivatives.

TABLE 1

UTERINE RESPONSE TO DIFFERENT ESTROGENS GIVEN SUBCUTANEOUSLY

| Compound | SC Dose (μG/D) | Average Increase Uterine Wt. (MG) | ± | S.E. |
| --- | --- | --- | --- | --- |
| 17α-Ethynylestriol 3-cyclopentyl ether | 0.03 | 8.4 | ± | 1.6 |
| | 0.1 | 49.9 | ± | 2.7 |
| | 0.3 | 54.9 | ± | 3.6 |
| | 1.0 | 41.7 | ± | 2.2 |
| Quinestrol | 0.1 | 7.8 | ± | 3.0 |
| | 0.3 | 36.0 | ± | 5.9 |
| | 1.0 | 51.1 | ± | 3.2 |
| | 3.0 | 37.0 | ± | 3.0 |
| Quinestradol | 0.3 | 11.0 | ± | 1.9 |
| | 1.0 | 43.2 | ± | 3.5 |
| | 3.0 | 49.3 | ± | 2.5 |
| Estriol | 0.3 | 5.2 | ± | 0.5 |
| | 1.0 | 7.3 | ± | 1.1 |
| | 3.0 | 11.8 | ± | 2.3 |

TABLE 2

UTERINE RESPONSE TO DIFFERENT ESTROGENS GIVEN ORALLY

| Compound | SC Dose (μG/D) | Average Increase Uterine Wt. (MG) | ± | S.E. |
| --- | --- | --- | --- | --- |
| 17α-Ethynylestriol 3-cyclopentyl ether | 0.01 | 6.8 | ± | 1.9 |
| | 0.03 | 15.3 | ± | 1.0 |
| | 0.1 | 47.3 | ± | 5.2 |
| | 0.3 | 48.8 | ± | 3.0 |
| | 1.0 | 46.6 | ± | 1.9 |
| Quinestradol | 0.1 | 0.9 | ± | 1.0 |
| | 0.3 | 1.7 | ± | 0.8 |
| | 1.0 | 11.7 | ± | 2.7 |
| | 3.0 | 42.3 | ± | 4.0 |
| 17-Ethynylestriol | 0.03 | 0.5 | ± | 0.3 |
| | 0.1 | 1.3 | ± | 1.0 |
| | 0.3 | 2.9 | ± | 0.9 |
| | 1.0 | 5.8 | ± | 1.4 |

An additional experiment demonstrates that 17α-ethynylestriol 3-cyclopentyl ether has a unique action in its ability to act preferentially on the vagina. It has been demonstrated by Jensen et al., Steroids 13, 417–427 (1969) that the binding capacity of the estrogen binding protein of the cytoplasm is reduced after the rat is treated with estrogen. This reduction in binding capacity is significantly lowered at 4 hours after estrogen administration and generally returns to pretreatment levels at 24 hours. Clark et al., Biochimica et Biophysica Acta 192, 508–515 (1969) reported a simple convenient method to determine the amount of estrogen binding protein in the cytoplasm by utilizing the adhesive properties of the protein after it had bound estradiol.

In practice, the determination of the binding capacity of the uterus and vagina for two estrogens was carried out in the following manner. Groups of six rats were given a single subcutaneous injection of 0.3 μg/rat of the test material at 0 time. A control group received only the corn oil vehicle. Groups were sacrificed at 4, 24 and 48 hours after treatment and the tissues from the six rats pooled. The pooled tissues were homogenized in Tris buffer. A cytoplasmic fraction was prepared by centrifugation in which cell debris and nuclei were removed. Two μCi of estradiol-6,7$^3$H(42.5 Ci/mM) were added to 2 ml. of the cytoplasmic fraction. After 10 minutes a 1 ml. aliquot was transferred to a tube containing 100 mg. of finely ground glass. After a 30 minute incubation period, the ground glass was washed 3 times with buffer to remove unbound estradiol. The receptor-estradiol 6,7$^3$H complex is then stripped from the ground glass with ethanol. The amount of radioactivity is determined by liquid scintillation spectrometry.

Figure 3:
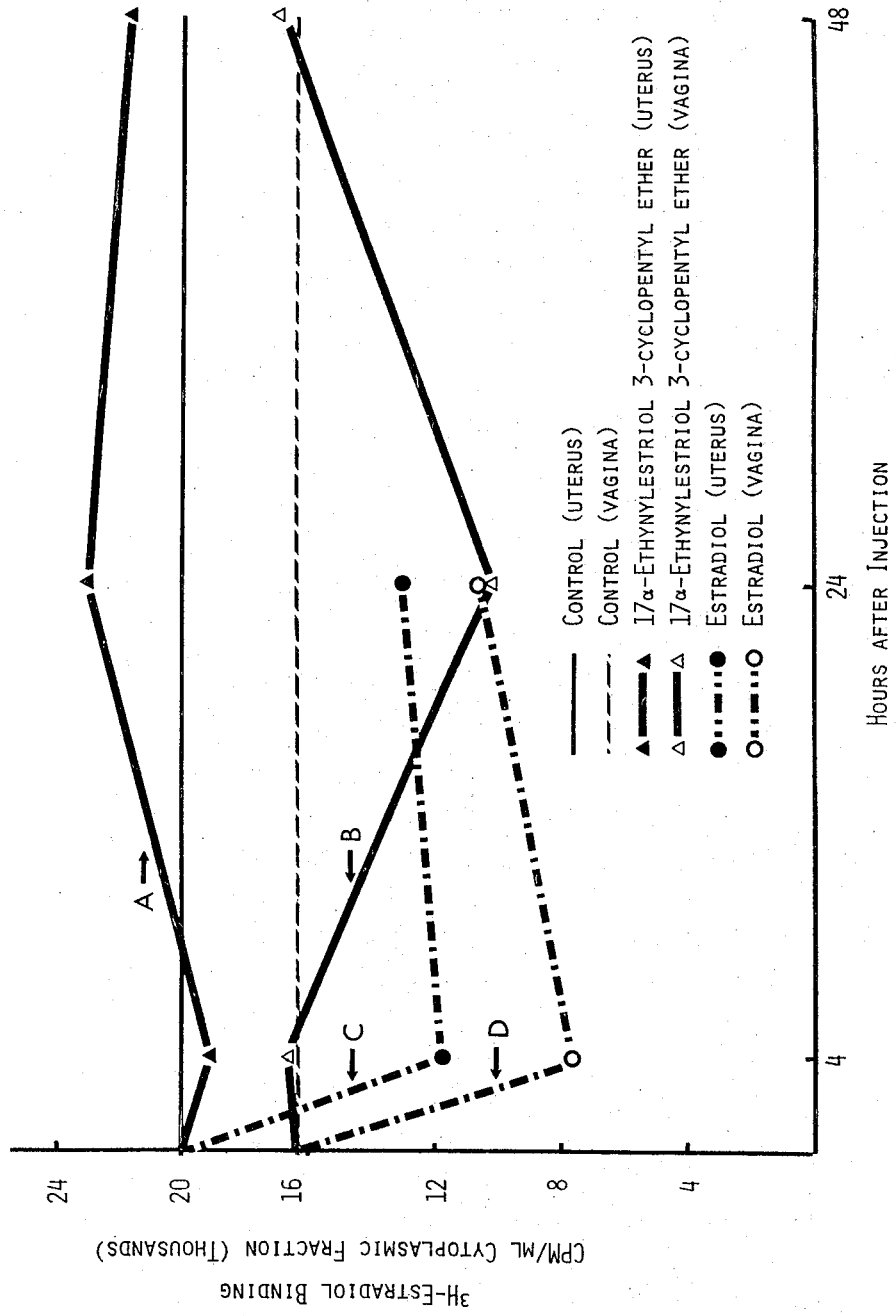

A reduction in the amount of radioactive estradiol bound in vitro by the cytoplasmic fraction is an indication that the tissue had previously been exposed to estrogen which reduced the binding capacity of the estrogen binding protein. FIG. 3 shows the results of the above experiment using estradiol or 17α-ethynylestriol 3-cyclopentyl ether. The narrow solid line shows the level of $^3$H-estradiol binding by control uterine tissue. The narrow cross-hatched line gives the level of binding for control vaginal tissue. A dose of 0.3μg/rat of 17α-ethynylestriol 3-cyclopentyl ether reduced the binding capacity of vaginal tissue (curve 3-B) but did not reduce the binding capacity of uterine tissue (curve 3-A). This finding indicates that 17α-ethynylestriol 3-cyclopentyl ether has a prolonged preferential effect on the vagina while not acting on the uterus. By contrast, estradiol depleted both uterine (curve 3-C) and vaginal (curve 3-D) estrogen binding protein by about the same amount.

Table 3 summarizes in quantitative form the data presented graphically in FIG. 3. In Table 3 the data is presented in terms of counts per minute (cpm) per milliliter of cytoplasmic fraction at different time intervals.

In employing 17α-ethynylestriol 3-cyclopentyl ether for treatment of estrogen-deficiency conditions, particularly spontaneous or induced menopausal syndrome, a dose which provides on the average from 5 to 500 mcg. per day is used. In order to obtain the above dosage rate, the compound can be given daily, or less frequently if desired. Since the compound is orally effective, it is preferably employed as is stilbestrol in the treatment of menopausal syndrome by the oral route.

The chief estrogen-deficiency state which 17α-ethynylestriol 3-cyclopentyl ether is useful in treating is menopausal syndrome, either spontaneous or induced. Included in the term menopausal syndrome are one or more of the following symptoms: hot flashes, nervous irritability, depression, nocturnal sweating, leukoplakia, senile colpitis, vaginal kraurosis, kraurosis of the vulva, pruritus vulvae, post-menopausal osteoporosis and premature menopausal arteriosclerosis. Other similar estrogen-deficiency conditions, either natural or induced, can also be treated by the process of this invention.

17α-Ethynylestriol 3-cyclopentyl ether can be administered in corn oil by the subcutaneous route or in tablet form for administration by the oral route. A tablet suitable for oral administration contains the following ingredients:

| Ingredient | Parts by weight |
| --- | --- |
| 17α-Ethynylestriol 3-cyclopentyl ether | 0.5 |
| Tragacanth | 2 |
| Lactose | 89 |
| Corn starch | 5 |
| Talcum | 3 |
| Magnesium stearate | 0.5 |

The above illustrates a dose of 500 μg in a 100 mg tablet. If a lower dose, such as 50 μg, is to be employed the parts by weight of the other ingredients would be adjusted so as to provide a tablet of about 100 mg, or any desirable size, as will be apparent to those skilled in the art.

TABLE 3

INTERACTION OF ESTRADIOL AND 17α-ETHYNYLESTRIOL 3-CYCLOPENTYL ETHER WITH UTERINE AND VAGINAL ESTROGEN RECEPTORS

| | Dose SC | CPM/ml Cytoplasmic Fraction | | | | | | | |
| --- | --- | --- | --- | --- | --- | --- | --- | --- | --- |
| | | Time After Administration (Hours) | | | | | | | |
| | | 0 | | 4 | | 24 | | 48 | |
| | | Uterus | Vagina | Uterus | Vagina | Uterus | Vagina | Uterus | Vagina |
| Control | 0 | 20,362 | 16,439 | | | | | | |
| 17α-Ethynylestriol 3-cyclopentyl ether | 0.3μg | | | 19,312 | 16,444 | 23,137 | 10,229 | 21,630 | 17,076 |
| Estradiol | 0.3μg | | | 11,966 | 7,464 | 13,058 | 10,590 | | |

We claim:

1. The method of treating estrogen deficiency symptoms in mammals which comprises administering an average of from 5 to 500 μg. per day of 17α-ethynylestriol 3-cyclopentyl ether to a mammal suffering from estrogen deficiency.

2. The method of treating menopausal syndrome in human females which comprises administering an average of from 5 to 500 μg. per day of 17α-ethynylestriol 3-cyclopentyl ether to a human female suffering from one or more symptoms of said menopausal syndrome.

* * * * *